United States Patent
Schunk (10) Patent No.: US 7,447,437 B2
(45) Date of Patent: Nov. 4, 2008

(54) INTERFACE ARRANGEMENT FOR OPTO-ELECTRONIC DATA TRANSFER, AND PLUG-IN OPTO-ELECTRONIC TRANSCEIVER

(75) Inventor: Nikolaus Schunk, Maxhutte-Haidhof (DE)

(73) Assignee: Infineon Technologies Fiber Optics GmbH, Berlin (DE)

( * ) Notice: Subject to any disclaimer, the term of this patent is extended or adjusted under 35 U.S.C. 154(b) by 656 days.

(21) Appl. No.: 11/044,473

(22) Filed: Jan. 26, 2005

(65) Prior Publication Data

US 2005/0276607 A1   Dec. 15, 2005

Related U.S. Application Data

(60) Provisional application No. 60/579,537, filed on Jun. 9, 2004.

(51) Int. Cl.
*H04B 10/00* (2006.01)

(52) U.S. Cl. .................. 398/135; 398/136; 398/138; 398/139; 398/128; 398/130; 398/115; 398/118; 398/163; 398/164; 398/33; 398/38; 398/25; 398/182; 398/202; 398/41; 398/42; 385/88; 385/89; 385/90; 385/92; 385/93

(58) Field of Classification Search .............. 398/135, 398/82, 136, 137, 138, 33, 139, 38, 158, 398/159, 163, 164, 182, 202, 128, 41, 42, 398/25, 115, 118, 130; 385/89, 92, 93, 88

See application file for complete search history.

(56) References Cited

U.S. PATENT DOCUMENTS 7,021,971 B2 * 4/2006 Chou et al. .................. 439/660
7,174,106 B2 * 2/2007 Weber ........................ 398/135
7,302,186 B2 * 11/2007 Light et al. ................. 398/137

* cited by examiner

*Primary Examiner*—Hanh Phan
(74) *Attorney, Agent, or Firm*—Eschweiler & Associates, LLC (57) ABSTRACT

An interface arrangement for opto-electronic data transfer which has an electrical plug connection part which includes at least one electrical contact used by a connected plug-in transceiver to provide information related to the data transfer rate at which the connected plug-in transceiver is able to transmit optical signals. An electrical control apparatus connected to this contact is used to set the data transfer rate of signals transferred from an electrical chip to a connected plug-in transceiver, the control apparatus taking several specified data transfer rates and setting that data transfer rate on the electrical chip which is the maximum at which a connected plug-in transceiver is able to transfer, provided that this data transfer rate is lower than the data transfer rate which has been set internally on the electrical chip. An opto-electronic transceiver which can be connected to an interface arrangement in plug-in fashion is also disclosed.

19 Claims, 5 Drawing Sheets

INTERFACE ARRANGEMENT FOR OPTO-ELECTRONIC DATA TRANSFER, AND PLUG-IN OPTO-ELECTRONIC TRANSCEIVER

RELATED APPLICATION

The present application claims priority of U.S. patent application Ser. No. 60/579,537 filed by Nikolaus Schunk on Jun. 9, 2004.

FIELD OF THE INVENTION

The invention relates to an interface arrangement for opto-electronic data transfer and also to an opto-electronic transceiver which can be connected to such an interface arrangement in plug-in fashion. In particular, the invention relates to the extension of an IEEE 1394b standard interface which permits effective connection of an opto-electronic transceiver to a media-independent contact on the interface.

BACKGROUND TO THE INVENTION

The IEEE standard 1394b "High Performance Serial Bus" relates to serial high-speed data transfer between peripheral devices and a computer or between peripheral devices and computers. It standardizes not only a copper transmission line but also optical transmission lines comprising a plastic fiber or a glass fiber. The standard defines two different electrical contacts, a bilingual contact and a beta plug contact. The beta plug contact has nine pins and is in the form of a media-independent contact, that is to say that it is possible to connect any desired transmission media to the contact. A bilingual contact can be used only for copper media and is of no importance in the present context.

The IEEE 1394b standard is used, in particular, for high-speed data transfer between multimedia appliances and laptops. Since such appliances frequently have only small physical dimensions, there is normally a problem in implementing the transceiver required for electro-optical conversion on the interface card in a respective appliance in order to be able to connect optical transmission links. If the available space is not sufficient to integrate a transceiver, it is necessary to use an externally arranged interface card which has a copper input to the terminal and optical outputs to the optical transmission links. In this case, such an external interface card needs to have a physical layer chip implemented on it which provides functions on the physical layer of the data transfer. Such external interface cards are disadvantageously associated with high costs.

Physical layer chips control data transfer on the physical layer of the OSI reference model. The tasks of a physical layer chip include setting up and maintaining physical connections between adjacent stations. The voltage levels used are also defined, for example.

Such a physical layer chip is manufactured, by way of example, by the company Texas Instruments under the name TSB41BA3, "IEEE 1394b Three-Port Cable Transceiver/Arbiter". The appropriate specification can be retrieved on the Internet at http://focus.ti.com/lit/ds/symlink/tsb41ba3.pdf. The content of this specification is incorporated in the present application by reference.

There is a need for media-independent interfaces, particularly based on the IEEE 1394b standard, and also for associated plug-in opto-electronic transceivers with likewise standardized ports which, on the basis of an existing standard, extend the functionalities provided by the standard and consequently permit broad use, associated with few restrictions, of plug-in opto-electronic transceivers and optical transmission media.

SUMMARY OF THE INVENTION

The present invention provides an interface arrangement for opto-electronic data transfer which has an electrical plug connection part which is used for holding and making contact with a corresponding electrical plug connection part on a plug-in opto-electronic transceiver. In this arrangement, the electrical plug connection part has a plurality of electrical contacts which comprise: first electrical contacts for transferring data which are to be transmitted by a connected plug-in transceiver, second electrical contacts for transferring data which are received by a connected plug-in transceiver, and at least one third electrical contact which a connected plug-in transceiver uses to provide information relating to the data transfer rate at which the connected plug-in transceiver is able to transmit optical signals.

The interface arrangement also has an electrical chip for providing functions on the physical layer of the data transfer (also referred to as physical layer chip below), these functions including the production and detection of electrical signals which are present on the first and second contacts of the electrical plug connection part. The electrical chip has an internally set data transfer rate.

As a further element, the inventive interface arrangement has an electrical control apparatus which is connected to the at least one third electrical contact. This control apparatus is used to produce at least one control signal for the electrical chip in order to set the data transfer rate at which, during operation, signals are transferred from the electrical chip to a connected plug-in transceiver. In this arrangement, the control apparatus takes a plurality of specified data transfer rates and sets that data transfer rate on the electrical chip which is the maximum at which a connected plug-in transceiver is able to transfer, provided that this data transfer rate is lower than the data transfer rate which has been set internally on the electrical chip. If this data transfer rate is above the data transfer rate which has been set internally on the electrical chip, then the data transfer rate which has been set internally on the electrical chip remains unchanged.

The inventive solution provides an interface arrangement which can use a plug-in opto-electronic transceiver to produce an optical data input and output. By plugging an opto-electronic transceiver into the inventive interface arrangement on the two terminals on a data transmission link, optical data transfer can take place according to protocol. In this case, the data transfer rate which has been set internally on the physical layer chip is replaced by the data transfer rate of the connected plug-in opto-electronic transceiver by means of the at least one third electrical contact and the control apparatus. This allows "plug and play".

If, by way of example, an S400 physical layer chip (with a data transfer rate of 500 Mbit/s) is connected to an S200 transceiver (with a data transfer rate of 250 Mbit/s), the lower data rate S200 of the transceiver is adopted as the system data rate. The invention permits the use of a plug-in optical transceiver in a plug and play network, since the data rate of the connected plug-in transceiver is forwarded as system data rate to the physical layer chip, this data rate is signaled in the network at the data rate which is to be negotiated, and data are then transferred at this data rate.

The inventive solution also permits the use, in an optical network, of a mixture of old and new communication appliances and opto-electronic transceivers with different data rates. In this case, efforts are automatically made to ensure that the physical layer chip does not overtask the transceiver in terms of the data rate and instead the system data rate is respectively set to the highest possible data rate for the transceiver.

In one preferred refinement of the invention, the control apparatus is in the form of an ASIC logic chip whose outputs are connected to input pins on the electrical chip. The ASIC logic chip receives information about whether an opto-electronic transceiver has been plugged in and what maximum data rate it has, compares the maximum data rate of such a transceiver with the maximum data rate of the physical layer chip, and converts the data rate on the physical layer chip to the maximum possible data rate for the plug-in optical transceiver.

Alternatively, the control apparatus is not in the form of an ASIC logic chip, but rather is integrated in the physical layer chip.

The electrical plug connection part, the electrical chip and the control apparatus are preferably arranged on an interface card in a data processing unit. The data processing unit is, in particular, a computer or other multimedia appliance which transfers and receives data in high volume. In one preferred refinement, the electrical plug connection part has two separate plug-in areas. In this case, at least one of the two plug-in areas forms a standardized plug-in area, particularly in line with the IEEE 1394b standard. The other plug-in area is not necessarily standardized, but may likewise be so. The two plug-in areas are arranged, by way of example, next to one another on the plug connection part. Alternatively, other configurations may be produced, for example the additional plug-in area may be formed around the standardized plug-in area.

Splitting the plug connection part into two separate plug-in areas, at least one of which is in standardized form, has the advantage that an interface which has already been specified merely needs to be extended. In particular, an IEEE Standard 1394b beta plug-in area is extended merely by further contacts, these further contacts permitting additional functionality. Thus, a media-independent electrical (copper) interface is provided which is in a form based on the standard in one area and allows an additional area to have additional functions. The additional area may likewise be standardized.

In one preferred refinement, the electrical plug connection part also has a fourth contact, which is used to supply a "wake-up and signal-detect" signal which provides information about whether a connected plug-in transceiver is detecting light signals. A familiar feature of modern data processing units is power management, which puts the unit into a sleep mode (ultra low power mode) when there is no activity. When a "wake-up and signal-detect" signal appears, the unit or the entire bus wakes up. The signal is produced as soon as light signals are detected by the reception device in the connected transceiver. The optical network and the units involved are thus transferred to a sleep state with very low power consumption when they are not being used. When an incoming signal is detected, a "wake-up and signal-detect" signal restores full functionality.

In another preferred refinement, the electrical plug connection part also has a fifth contact, which is used to supply an "internal/external-select" signal. This signal provides information about whether a plug-in transceiver is connected to the interface. By way of example, it is a mechanical contact which is automatically activated when a corresponding plug connection part of a plug-in transceiver is plugged in. The internal/external-select signal is likewise supplied to the control apparatus. As soon as such a signal appears, the control apparatus changes the data transfer rate of the physical layer chip to the maximum data rate of the connected transceiver.

The internal/external-select signal is triggered exclusively when an opto-electronic transceiver is plugged into the plug connection part of the interface arrangement. If, by contrast, data transfer takes place using copper media, for example, so that the data transfer rate which has been set internally on the physical layer chip can be used, no such internal/external-select signal is triggered.

The additional third, fourth and fifth contacts are preferably produced in a supplementary plug-in area of the plug connection part. By contrast, the first and second electrical contacts relating to the data which are to be transferred and the data which have been received are preferably produced in an IEEE 1394b standard beta plug-in area. In addition, the IEEE 1394b beta plug-in area naturally also has further contacts based on the standard, such as for ground and for the operating voltage.

There are numerous options for how an opto-electronic transceiver connected to the interface arrangement uses the at least one third electrical contact to code the information about its maximum data transfer rate.

In one refinement, the at least one third electrical contact has a plurality of third contacts, whose electrical signals code the data rate of the connected plug-in transceiver. By way of example, the third contacts are mechanical contacts which have contact made with them by corresponding mechanical contacts on a corresponding plug connection part of an opto-electronic transceiver which has been plugged in. This governs the production of electrical signals in the interface arrangement which code the maximum data transfer rate of the transceiver. By way of example, five third contacts are provided, which can code an effective transfer rate (speed) of S100, S200, S400, S800, S1600, and S3200. In this case, each contact provides a "0" or a "1" in a binary coding.

In another refinement, the third contacts have been assigned particular voltage levels which code the maximum data transfer rate.

It will also be pointed out that it is in no way necessary to provide a plurality of third contacts. In another refinement, just one third contact is provided. By way of example, the data transfer rate which has been set on the plugged-in opto-electronic transceiver is coded using a particular frequency of an electrical signal. To this end, the opto-electronic transceiver would additionally have a frequency generation apparatus and the interface arrangement would additionally have a frequency detection device, in which case the frequency which is then detected would code the maximum data transfer rate of the transceiver.

The plug connection part of the interface arrangement is preferably in the form of a plug socket, particularly in the form of an IEEE 1394b beta plug socket. The corresponding plug connection part of a plug-in transceiver is accordingly preferably in the form of a plug, particularly in the form an IEEE 1394b beta plug. Alternatively, the socket and plug forms may naturally be the other way round.

Besides the interface arrangement which has been explained, the invention also relates to a plug-in opto-electronic transceiver which can be connected to an interface arrangement based on the invention in plug-in fashion. Such an opto-electronic transceiver has an electro-optical transmission device, an opto-electronic reception device, at least one optical port for coupling at least one optical fiber, and a plug-in electrical port for making electrical contact with the transceiver. In this arrangement, the plug-in electrical port comprises an electrical plug connection part which—in a similar manner to the plug connection part of the interface arrangement—has first electrical contacts for transferring data which are to be transmitted by the transceiver, second electrical contacts for transferring data which are received and forwarded by the transceiver, and at least one third electrical contact which the transceiver uses to provide information relating to the data transfer rate at which the connected plug-in transceiver is able to transmit and receive optical signals.

The plug connection part of the opto-electronic transceiver is produced in a form corresponding to the plug connection part of the interface arrangement.

BRIEF DESCRIPTION OF THE DRAWINGS

The invention is explained in more detail below using a plurality of exemplary embodiments with reference to the figures, in which.

DESCRIPTION OF SEVERAL PREFERRED EXEMPLARY EMBODIMENTS

To improve the understanding of the invention, reference will first be made to FIG. 4 in order to describe the problems which arise when using a plug-in opto-electronic transceiver in conjunction with a conventional interface not designed in line with the invention. The components described below have all been produced in line with the IEEE 1394b standard. The problems which arise and their solutions can also be found in a similar manner in components which have been produced in line with other standards, however, and can therefore be applied to such other components.

Figure 4:
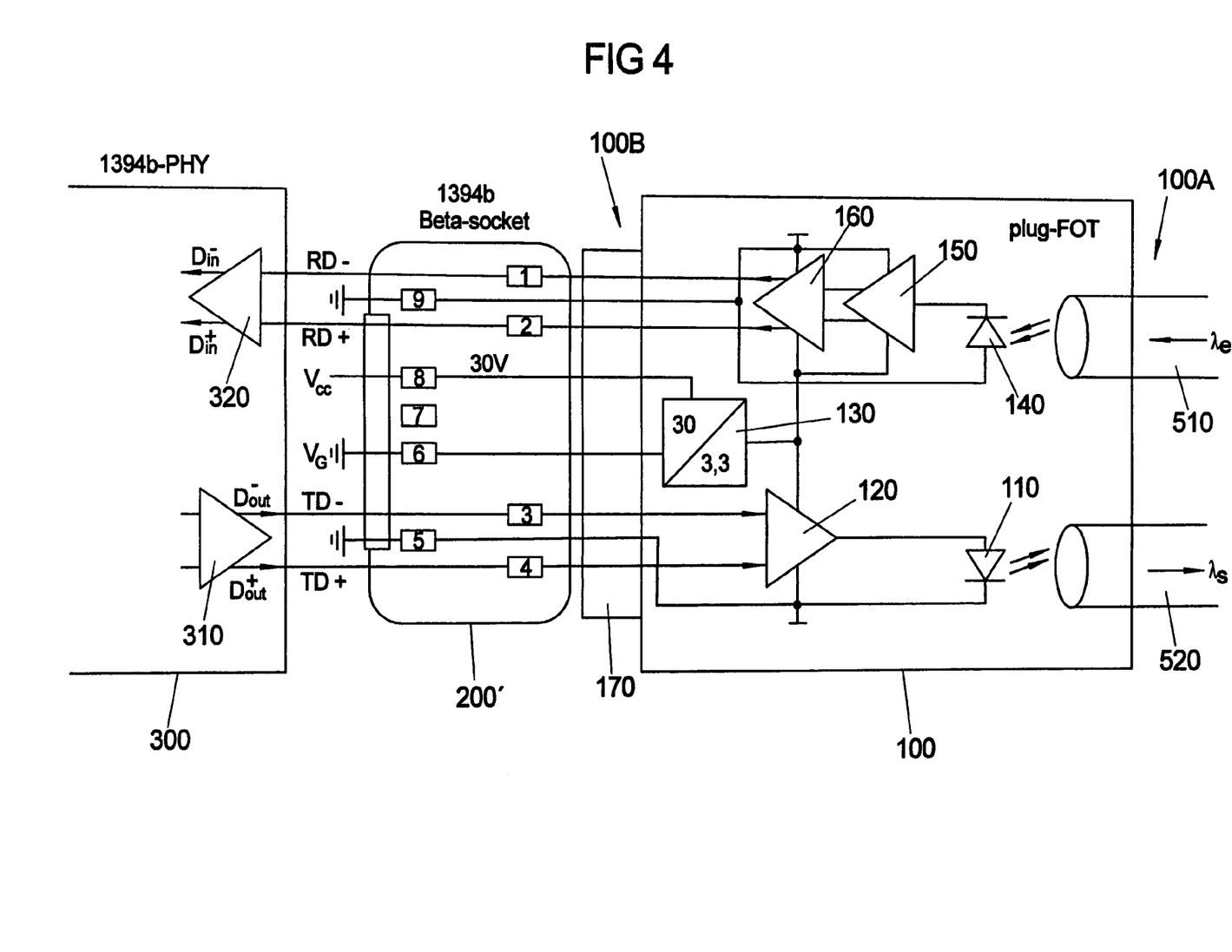
FIG. 4 shows the connection between an IEEE 1394b physical layer chip, an IEEE 1394b beta plug contact (beta socket) and an opto-electronic transceiver which is connected to the plug contact in plug-in fashion, where the plug contact has no additional contacts as shown in FIG. 1.

FIG. 4 shows, as primary components, a plug-in opto-electronic transceiver 100, a media-independent IEEE 1394b beta plug contact 200' (1394b beta socket) and an electrical chip 300 for providing functions on the physical layer of the data transfer. Such a physical layer chip is also referred to as PHY chip below.

The 1394b beta plug contact 200', produced according to the standard, has nine contacts 1 to 9. Contacts 1 and 2 are used to supply differential received data RD−, RD+. Contacts 3, 4 are used to supply differential transmitted data TD−, TD+. Contacts 5, 6, 9 are grounded. Contact 8 is used to provide an operating voltage $V_{CC}$ of 30 V. Contact 7 is not used.

The plug-in opto-electronic transceiver 100 (plug-FOT) has a transmission device 110, 120, a reception device 140, 150, 160, a voltage converter 130, an optical port 100A for coupling two optical fibers to it and an electrical port 100B for making electrical contact with the plug-in transceiver 100. The transmission device comprises, in a manner which is known per se, a semiconductor diode 110, to which the signals from a driver 120 are applied. In this arrangement, a differential input signal TD−, TD+ is supplied to the driver 120 from the contacts 3, 4 of the beta plug contact 200'. The driver converts this signal into an actuation signal for the transmission diode 110.

The reception device comprises a reception diode 140, a pre-amplifier 150 and a post-amplifier 160. The differential received data RD−, RD+ in the post-amplifier 160 are supplied to the two contacts 1 and 2 of the beta plug connector 200'.

The supply voltage for the optical transceiver 100 is obtained from contacts 8 and 6 on the 1394b beta plug contact 200'. In this case, the DC/DC voltage converter 130 obtains a 3.3 V supply voltage for the opto-electronic transceiver 100 from the 30 V operating voltage $V_{CC}$. The supply voltage is thus supplied from the outside (remote powering).

The optical interface 100A permits optical coupling between the transmission diode 110 and an associated optical fiber 520 and also optical coupling between an optical fiber 510 and the reception diode 140. The radiated wavelength $\lambda_s$ and the received wavelength $\lambda_E$ are different upon transfer via one optical fiber. With two optical fibers, they are preferably the same. The optical fibers 510, 520 may be connected as a fiber pigtail to a standardized plug or alternatively via a header plug contact to the transceiver 100. In the first case, the optical fibers 510, 520 at the transceiver end are firmly connected thereto and, at their end which is remote from the transceiver, provide a plug connection for a further optical fiber. In the second case, the transceiver 100 has plug receptacles for coupling an optical plug in plug-in fashion.

The electrical or copper interface 100B is provided by an electrical 1394b beta plug 170. The 1394b beta plug 170, like the 1394b beta plug contact 200', has nine contacts which, when the plug 170 is plugged into the beta plug contact 200', come into electrical contact with contacts 1-9 on the beta plug contact 200', so that signal transfer takes place.

It will be pointed out that the illustrated refinement of the opto-electronic transceiver 100 is to be understood merely by way of example. The actual connection of the transmission diode 110 and the reception diode 140 may vary.

The 1394b beta plug contact 200' is connected to the 1394b PHY chip 300 by means of four data lines on which the differential received data RD−, RD+ and the differential transmitted data TD−, TD+ are transferred. A 1394b PHY chip 300 is manufactured, by way of example, by the company Texas Instruments under the product name TSB41BA3. The PHY chip 300 ensures connection setup, connection provision and the maintenance of a physical connection to a communication partner on the physical layer of the OSI reference model. By way of example, the specification for the voltages used on the copper wires is also provided by the PHY chip 300.

The PHY chip 300 uses a circuit 310 (shown schematically) to provide a differential output signal $D-_{out}$, $D+_{out}$ which is supplied as differential transmitted signal TD−, TD+ to the transceiver 100 via contacts 3, 4 on the plug contact 200' and on the plug 170. At the same time, the PHY chip 300 detects differential received data RD−, RD+ transferred via contacts 1 and 2 and forwards these data from an electrical circuit 320 (shown schematically) as digital data $D-_{IN}$, $D+_{IN}$.

The data transfer from the PHY chip 300 to the beta plug contact 200' takes place in serial form. The PHY chip 300 is normally connected to a link layer controller (LLC) at the unit end.

The PHY chip 300 and the beta plug contact 200' are preferably arranged on an interface card in a communication appliance. In this case, the beta plug contact 200' is preferably in the form of a plug socket. The transceiver 100 is plugged into the plug socket 200' using the electrical plug 170.

It will be pointed out that the beta plug contact 200' is media-independent. This means that plugs on any desired optical transmission media may be plugged into the beta plug contact 200'.

Although the standard 1394b beta plug contact shown in FIG. 4 provides the option of coupling an opto-electronic transceiver in the case of the optical data transfer under consideration, one problem is that data transfer by the transceiver 100 would not work if the data rate of the optical transceiver 100 were below that of the PHY chip 300. Thus, negotiation of the data transfer rate between two units results in the data transfer rate of the PHY chip 300 being agreed, but the transceiver 100 may not be able to transfer at this rate. In this case, the data rate is negotiated according to the standard using toning methods at the lowest data rate of 125 Mbit/s (S100) which is specified in the IEEE 1394b standard.

Another problem is that certain additional information, particularly regarding power management, cannot be taken into account. In particular, a signal-detect and wake-up signal relating to termination of a sleep state would need to be supplied via the single, still free contact 7 on the beta plug contact 200'. Contact 7 has already been reserved for future applications in the IEEE 1394b standard, however.

Figure 1:
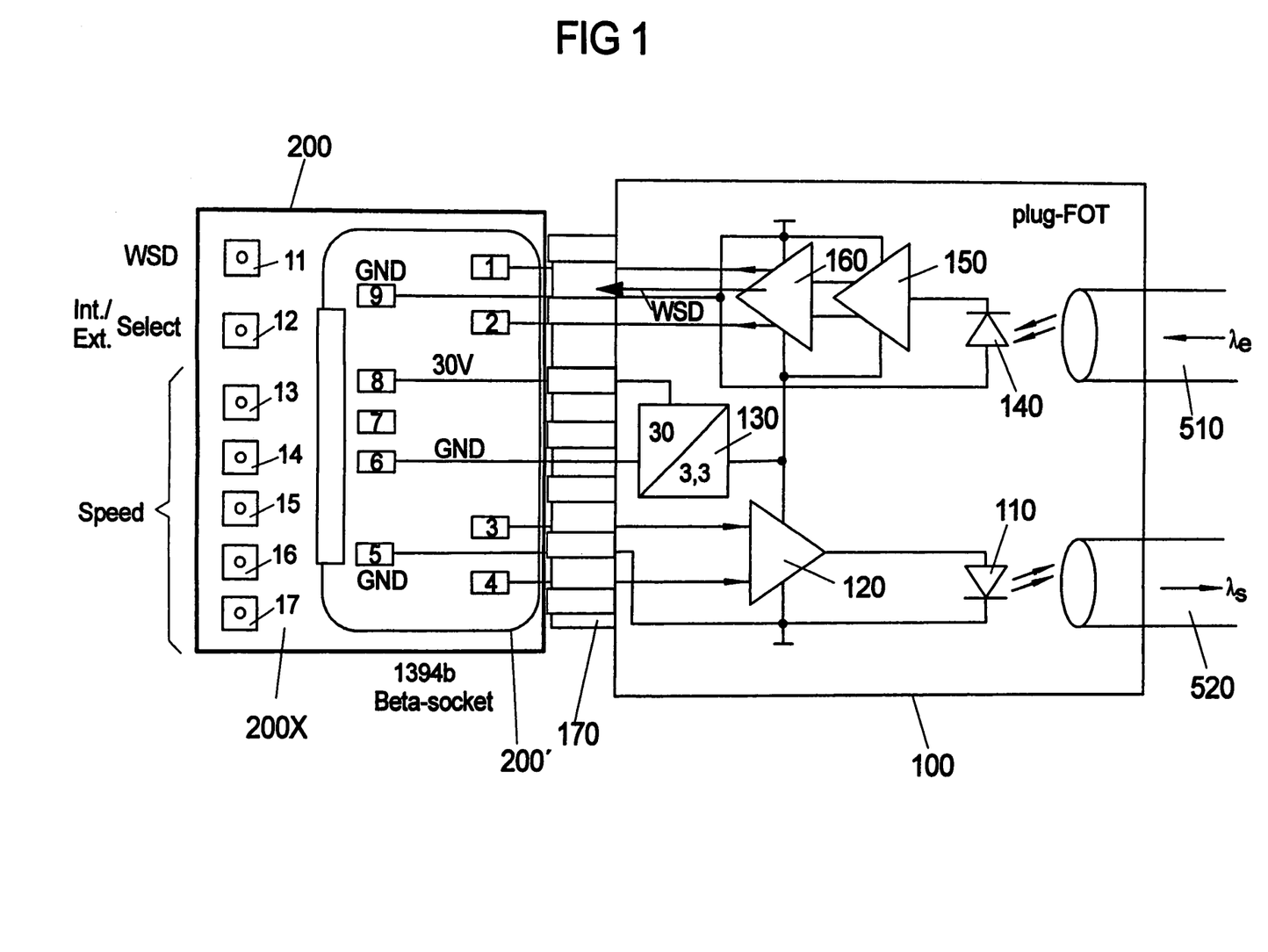
FIG. 1 shows an IEEE 1394b beta plug contact (beta socket) on an interface arrangement, the 1394b beta plug contact having been extended by additional electrical contacts, and also an associated opto-electronic transceiver which is connected to the 1394b beta plug contact in plug-in fashion.

FIG. 1 shows an interface arrangement with an extended beta plug contact 200, which comprises the standardized 1394b beta plug contact 200' shown in FIG. 4 and a supplementary plug-in area 200X with additional contacts 11 to 17. The use of contacts 1 to 9 on the beta plug contact 200' is as described in relation to FIG. 4, so that reference will be made thereto.

Contact 11 is used to provide an additional signal "WSD"—wake-up and signal-detect. The signal is produced by the reception device in the opto-electronic transceiver 100 when the reception diode 140 detects incoming light signals. The WSD signal allows the optical network and the components involved to be transferred to a sleep state with very low power consumption when they are not being used. Not until a useful signal is detected does the WSD signal cause the unit and the entire bus to wake up.

Contact 12 is used to supply an "internal/external-select" signal. A corresponding signal is produced when a plug-in optical transceiver 100 has been plugged into contact 200. In this case, the signal may be produced in the transceiver 100 or alternatively in the extended beta plug contact 200. Contacts 13 to 17 code—for example as part of the binary coding—the maximum data transfer rate of a transceiver 100 which has been plugged in.

All additional electrical contacts 11 to 17 are connected to the PHY chip or to an ASIC logic chip associated therewith, as will be explained with reference to FIGS. 3A and 3B. The additional contacts 11 to 17 are thus used for transferring information in the direction of the PHY chip.

The function of the WSD signal has already been explained. By contrast, the internal/external-select signal supplied via contact 12 and the signals provided by contacts 13 to 17 serve to change the data rate of the PHY chip 300 (cf. FIG. 4) to the maximum possible data rate of the plug-in optical transceiver 100. To this end, contacts 12 to 17 are connected to an ASIC logic chip, for example.

When an internal/external-select signal is present, this logic chip set the maximum data transfer rate of the transceiver 100 as the data transfer rate of the PHY chip. By way of example, in the case of the aforementioned TSD41BA3 PHY chip from Texas Instruments, the data transfer rate can be set on pins SO_PC2 to S4_DS1. The outputs of the ASIC logic chip are accordingly connected to the SO_PC2 to S4_DS1 pins of the TSB41BA3 chip. The internal/external-select signal indicates whether the data rate which has been set internally on the PHY chip needs to be changed to the maximum possible data rate of the plug-in optical transceiver 100. Contacts 13 to 17 (also called speed contacts) contain the information about the magnitude of the maximum possible transfer rate of the plug-in transceiver 100.

There are several options for using contacts 13 to 17 to code the maximum data transfer rate of a transceiver 100 which has been plugged in. In one exemplary embodiment, the individual contacts are actively assigned a particular voltage level, the voltage levels being used for the coding. In another refinement, the contacts are of passive design and are in the form of purely mechanical contacts. By way of example, a contact 13 to 17 in the supplementary area 200X of the interface 200 provides a signal only when contact is made with it by a corresponding contact on the associated plug 170 on the transceiver. In this way, the number of contacts in the plug 170 on the transceiver 100 is a simple way of coding the maximum data transfer rate.

Numerous other coding options are also conceivable, however. First, there may be a different number of speed contacts 13 to 17 than is shown in FIG. 1. By way of example, just three speed contacts are sufficient to code data rates of S100, S200, S400, S800, S1600 and S3200. It is also conceivable for just one single contact to be provided for providing the information about the maximum data transfer rate of the transceiver. This contact could be used to provide an electrical signal having a particular frequency, for example using a frequency generator, in which case the frequency codes the maximum data transfer rate of the transceiver. Hence, it is thus merely a question of being able to use the supplementary part 200X of the extended beta plug contact 200 to provide additional information relating to the maximum data transfer rate of the transceiver 100 in some way.

It will be pointed out that the arrangement of the electrical additional contacts 11 to 17 in FIG. 1 is to be understood merely as being schematic. There are numerous options for arranging the additional contacts 11 to 17. By way of example, they are produced next to the already standardized 1394b beta plug contact in a separate plug-in area 200X.

Figure 2:
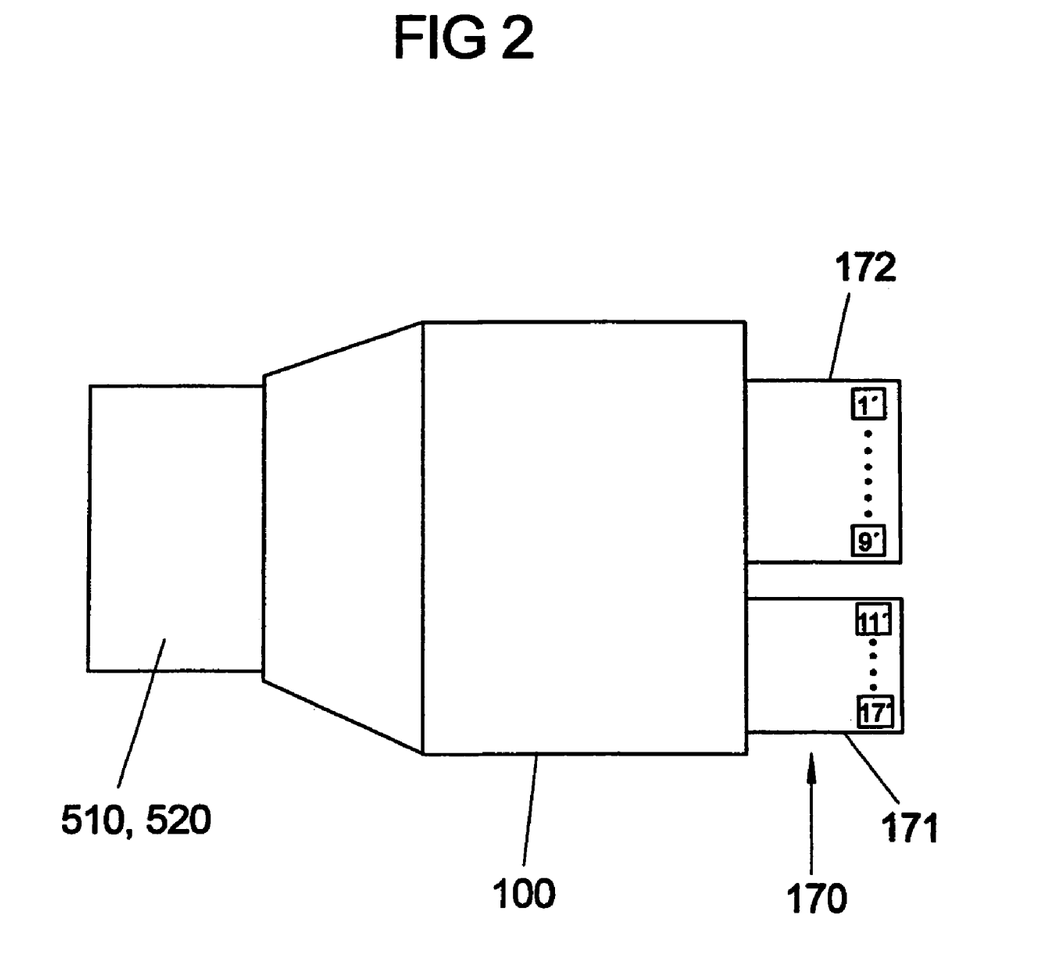
FIG. 2 schematically shows a media-independent IEEE 1394b beta plug with additional electrical contacts which are produced in a separate plug-in area.

It will also be pointed out that the plug 170 on the transceiver 100 also has additional contacts 11' to 17' corresponding to contacts 11 to 17 in the supplementary area 200X. This is shown schematically in FIG. 2. The electrical port 170 on the transceiver 100 is provided by two plug-in areas 171, 172 arranged next to one another. Plug-in area 172 contains contacts 1' to 9' corresponding to contacts 1 to 9 on the 1394b beta plug contact 200'. This is a standardized 1394b beta plug. The additional contacts 11' to 17' relating to the signaling of the data transfer rate and to the WSD signal and possibly to further contacts are provided by plug area 171. The arrangement of the two plug areas 171, 172 next to one another is again to be understood merely by way of example. The actual physical arrangement of the additional contacts 11' to 17' may also be different.

Figure 3A:
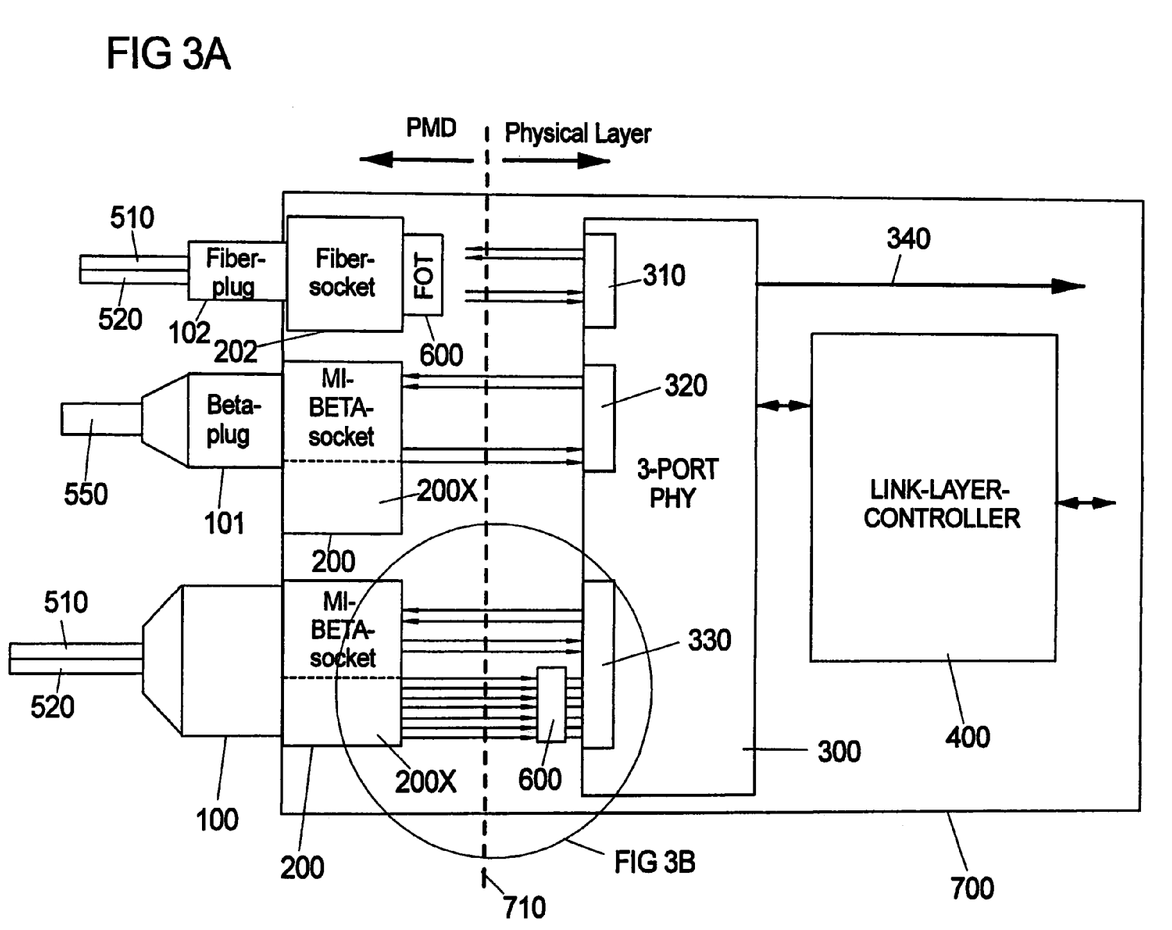
FIG. 3A shows three possible connection variants for IEEE 1394b beta mode data transfer between a physical layer chip and a data transfer medium.
Figure 3B:
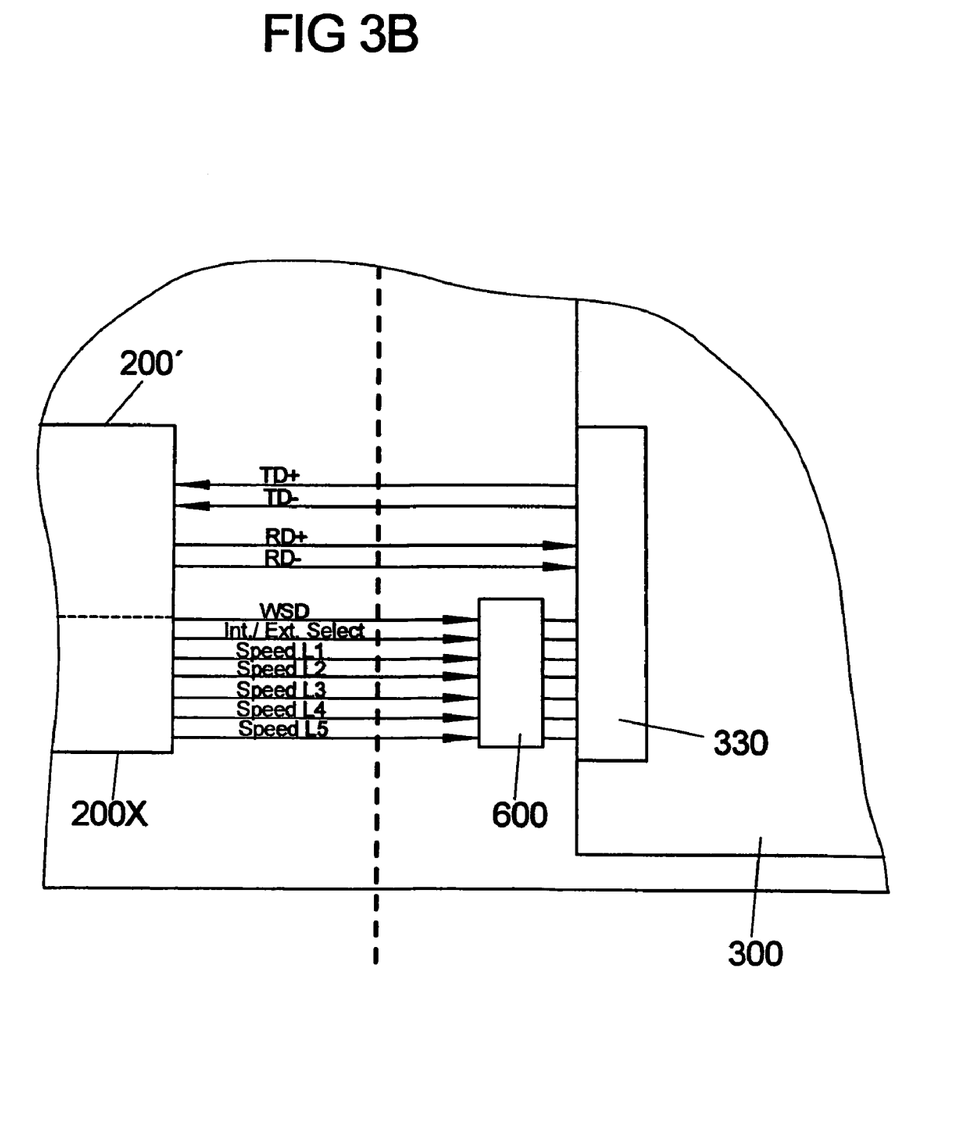
FIG. 3B shows a detailed view of FIG. 3A which shows the individual data lines between a media-independent extended IEEE 1394b beta plug contact and the associated physical layer chip or an interposed ASIC logic chip.

FIG. 3A schematically shows possible connection variants for IEEE 1394b beta mode data transfer between a PHY chip 300 and a data transfer medium 510, 520, 550. The PHY chip has three ports for data transfer.

The PHY chip 300, a plurality of plug interfaces 200, 202 and a link layer controller 400 are arranged on an interface card 700. The PHY chip 300 communicates with the link layer controller 400. There is also an internal serial bus connection 340 in the PHY chip 300. The logical dividing line 710 separates the physical area from the media-dependent area (physical media dependent—PMD).

The top port 310 is coupled to a transceiver 600 which is arranged in the interface 700 directly. The transceiver 600 has a plug socket 202 for holding an optical plug 102. The interface card 700 thus holds an optical transceiver 600. For this case, the optical transmission medium 510, 520 can be plugged in easily. For reasons of space and cost, however, and also taking into consideration the electrical power consumption in portable units, it is not always possible to integrate the transceiver onto the interface card.

Port 320 is connected to a media-independent extended 1394b beta plug connection part 200 as shown in FIG. 1. In the exemplary embodiment shown, a standardized 1394b beta plug 101 is used to connect a copper cable 550 as the transmission medium. The supplementary area 200X of the extended plug connection part 200 is not used in this refinement.

The bottom port 330 is coupled to a media-independent 1394b beta plug connection part 200 which has been supplemented in line with the invention. As FIG. 1 shows, a plug-in opto-electronic transceiver 100 whose signals are input and output into and from two optical fibers 510, 520 has been plugged into the plug connection part 200.

The supplementary area 200X provides additional electrical contacts 11-17, as described. This is shown in detail in FIG. 3B. The signals which are present on the additional contacts 11-17 in FIG. 1 are not connected to port 330 directly, but rather are supplied to an ASIC logic chip (electrical control apparatus) 600 via lines WSD, int./ext. select and speed L1 to speed L5. The outputs of this logic chip are connected to the associated input pins on port 330 of the PHY chip 300. The ASIC logic chip first controls whether or not the internal data transfer rate of the PHY chip is changed to the external data transfer rate of an opto-electronic transceiver which has been plugged in. Changeover takes place firstly if a transceiver has been plugged in and hence an internal/external-select signal is present, and secondly if the maximum data transfer rate of the transceiver is lower than the maximum data transfer rate of the PHY chip. Since the latter will normally be the case, the internal/external-select signal effects changeover in each case.

The number of contacts or pins for speed coding is to be understood merely by way of example.

The signal WSD is alternatively not supplied via the ASIC logic chip 600, but rather directly to port 330.

The use of an ASIC logic chip 600 has the advantage that it is possible to revert to PHY chips which are already available on the market. In principle, the functionality of the ASIC logic chip 600 may also be integrated into the PHY chip, however.

In one practical implementation of the interface card 700, just one of the three refinements shown will be provided. By providing an extended media-independent 1394b beta plug connection part 200, this permits the greatest possible flexibility and functionality for coupling a transmission medium for signal transfer.

Implementation of the invention is not limited to the exemplary embodiments illustrated above. A person skilled in the art will recognize that there are numerous alternative variant embodiments which, despite their departure from the exemplary embodiments described, make use of the teaching defined in the subsequent claims.

I claim:

1. An interface arrangement for opto-electronic data transfer, comprising:
    an electrical plug connection part for holding and making contact with a corresponding electrical plug connection part on a plug-in opto-electronic transceiver, the electrical plug connection part having a plurality of electrical contacts including:
        first electrical contacts for transferring data which are to be transmitted by a connected plug-in transceiver,
        second electrical contacts for transferring data which are received by a connected plug-in transceiver,
        at least one third electrical contact which a connected plug-in transceiver uses to provide information relating to the data transfer rate at which the connected plug-in transceiver is able to transmit optical signals,
    an electrical chip for providing functions on a physical layer of the data transfer, these functions including the production and detection of electrical signals which are present on the first and second contacts of the electrical plug connection part, and the electrical chip having an internally set data transfer rate,
    a plurality of data lines between the electrical chip and the first and second contacts,
    an electrical control apparatus, connected to the at least one third electrical contact, for producing at least one control signal for the electrical chip in order to set the data transfer rate at which, during operation, signals are transferred from the electrical chip to a connected plug-in transceiver,
    the control apparatus taking a plurality at specified data transfer rates and setting that data transfer rate on the electrical chip which is the maximum at which a connected plug-in transceiver is able to transfer, provided that this data transfer rate is lower than the data transfer rate which has been set internally on the electrical chip.

2. The interface arrangement as claimed in claim 1, wherein the control apparatus comprises an ASIC logic chip whose outputs are connected to input pins on the electrical chip.

3. The interface arrangement as claimed in claim 1, wherein the electrical plug connection part, the electrical chip and the control apparatus are arranged on an interface chard in a data processing unit.

4. The interface arrangement as claimed in claim 1, wherein the electrical contacts of the electrical plug connection part are produced in two separate plug-in areas and at least one of the two plug-in areas forms a standardized plug-in area.

5. The interface arrangement as claimed in claim 4, wherein the two plug-in areas are arranged next to one another.

6. The interface arrangement as claimed in claim 4, wherein the standardized plug-in area comprises an IEEE 1394b beta plug-in area.

7. The interface arrangement as claimed in claim 6, wherein the first and second electrical contacts are located in an IEEE 1324b beta plug-in area, while the at least one third electrical contact and further additional contacts are located in a supplementary plug-in area of the plug connection part.

8. The interface arrangement as claimed in claim 1, wherein the electrical plug connection part further comprises a fourth contact for supplying a "wake-up and signal-detect" signal that provides information about whether a connected plug-in transceiver is detecting light signals.

9. The interface arrangement as claimed in claim 1, wherein the electrical plug connection part further comprises a fifth contact for supplying an "internal/external-select" signal that provides information about whether a plug-in transceiver is connected, with a signal which is present on the fourth contact likewise being supplied to the control apparatus.

10. The interface arrangement as claimed in claim 1, wherein the at least one third electrical contact comprises a plurality of third contacts, whose electrical signals code the data rate of a connected plug-in transceiver.

11. The interface arrangement as claimed in claim 1, wherein the control apparatus is integrated in the electrical chip.

12. A plug-in opto-electronic transceiver which can be connected to an interface arrangement in plug-in fashion, the interface arrangement comprising:
an electrical plug connection part for holding and making contact with a corresponding electrical plug connection part on a plug-in opto-electronic transceiver, the electrical plug connection part having a plurality of electrical contacts including:
first electrical contacts for transferring data which are to be transmitted by a connected plug-in transceiver,
second electrical contacts for transferring data which are received by a connected plug-in transceiver,
at least one third electrical contact which a connected plug-in transceiver uses to provide information relating to the data transfer rate at which the connected plug-in transceiver is able to transmit optical signals,
an electrical chip for providing functions on a layer of the data transfer, these functions including the production and detection of electrical signals which are present on the first and second contacts of the electrical plug connection part, and the electrical chip having an internally set data transfer rate,
a plurality of data lines between the electrical chip and the first and second contacts,
an electrical control apparatus, connected to the at least one third electrical contact, for producing at least one control signal for the electrical chip in order to set the data transfer rate at which, during operation, signals are transferred from the electrical chip to a connected plug-in transceiver,
the control apparatus taking a plurality of specified data transfer rates and setting that data transfer rate on the electrical chip which is the maximum at which a connected plug-in transceiver is able to transfer, provided that this data transfer rate is lower than the data transfer rate which has been set internally on the electrical chip,
wherein the opto-electronic transceiver comprises:
an electro-optical transmission device,
an opto-electronic reception device,
at least one optical port for coupling at least one optical fiber,
a plug-in electrical port for making electrical contact with the transceiver,
the plug-in electrical port comprising an electrical plug connection part which has:
first electrical contacts for transferring data which are to be transmitted by the transceiver,
second electrical contacts for transferring data which are receive and forwarded by the transceiver, and
at least one third electrical contact which the transceiver uses to provide information relating to the data transfer rate at which the connected plug-in transceiver is able to transmit optical signals.

13. The transceiver as claimed in claim 12, wherein the electrical contacts of the electrical plug connection part are produced in two separate plug-in areas, and at least one of the two plug-in areas forms a standardized plug-in area.

14. The transceiver as claimed in claim 13, wherein the two plug-in areas are arranged next to one another.

15. The transceiver as claimed in claim 13, wherein the standardized plug-in area comprises and IEEE 1394b beta plug-in area.

16. The transceiver as claimed in claim 15, wherein the first and second electrical contacts are located in an IEEE 1394b beta plug-in area, while the at least one third electrical contact and further additional contacts are located in a supplementary plug-in area of the plug connection part.

17. The transceiver as claimed in claim 12, wherein the electrical plug connection part further comprises a fourth contact for supplying a "wake-up and signal-detect" signal that provides information about whether the transceiver is detecting light signals.

18. The transceiver as claimed in claim 12, wherein the electrical plug connection part further comprises a fifth contact for supplying an "internal/external-select" signal that provides information about whether the transceiver is connected.

19. The transceiver as claimed in claim 12, wherein the at least one third electrical contact comprises a plurality of third contacts, whose number codes the data rate of the transceiver.

* * * * *

UNITED STATES PATENT AND TRADEMARK OFFICE
CERTIFICATE OF CORRECTION

PATENT NO.       : 7,447,437 B2
APPLICATION NO.  : 11/044473
DATED            : November 4, 2008
INVENTOR(S)      : Schunk

Page 1 of 1

It is certified that error appears in the above-identified patent and that said Letters Patent is hereby corrected as shown below:

Column 10, claim 7, line 60; please replace "1324b" with --1394b--
Column 11, claim 12, line 31; please replace "a layer" with --a physical layer--

Signed and Sealed this

Thirtieth Day of December, 2008

JON W. DUDAS
*Director of the United States Patent and Trademark Office*